METHOD AND APPARATUS FOR COATING MAGNETIC DISCS

Filed March 29, 1965 2 Sheets-Sheet 1

INVENTOR
CHARLES W. DAVID
BY Samuel Lindenberg
Abraham Wasserman
ATTORNEY

April 16, 1968 C. W. DAVID 3,378,394

METHOD AND APPARATUS FOR COATING MAGNETIC DISCS

Filed March 29, 1965 2 Sheets-Sheet 1

INVENTOR
CHARLES W. DAVID
BY Samuel Lindenberg
Abraham Wasserman
ATTORNEYS

United States Patent Office
3,378,394
Patented Apr. 16, 1968

3,378,394

METHOD AND APPARATUS FOR COATING MAGNETIC DISCS

Charles W. David, Los Angeles, Calif., assignor to Data Products Corporation, Culver City, Calif., a corporation of Delaware Filed Mar. 29, 1965, Ser. No. 443,237
8 Claims. (Cl. 117—105.3)

This invention relates to a method and apparatus for coating magnetic discs and, more particularly, to improvements thereof.

Magnetic discs of the present day type which are used for information storage must be made with great precision. Generally, the metal of the discs has a high internal loss characteristic which damps out vibration rapidly, thereby preventing any form of resonance as the discs rotate at a selected speed. Each disc is precision ground and lapped to a few millionths of an inch finish.

The flat surfaces of the disc are then coated with a thin precisely controlled layer of magnetic material. The thickness and uniformity of the coated layer of magnetic material must be precisely controlled to insure uniform magnetic characteristics over the entire coated surface of the disc. Since most of the magnetic discs are 10 to 30 and more inches in diameter, prior art methods and devices for coating them have been found to be unsatisfactory, resulting in the rejection of a high percentage of coated discs.

Accordingly, it is an object of the present invention to provide a novel method and apparatus for coating a surface to a precisely controlled thickness.

Another object of the invention is the provision of a new and relatively simple method and apparatus for coating a surface to precisely controlled thickness and uniformity.

A further object of the invention is to provide a novel method of coating a flat surface such as a disc with a thin precisely controlled layer of material having uniform magnetic characteristics over the entire surface of the disc.

Still a further object of the invention is the provision of an apparatus for coating discs with magnetic material with the thickness and uniformity of the coating being precisely controlled.

These and other objects of the invention are achieved by providing a method and apparatus whereby the disc to be coated is moved back and forth or reciprocates in a first axis, and the magnetic material is provided through a spraying assembly which also reciprocates with respect to the moving disc. The rates of reciprocation of both the disc and spraying assembly are controllable so that the number of coats of magnetic material deposited on the disc is controlled. Also, the magnetic material is supplied to the spraying assembly under controlled pressure so that the thickness of each coat of magnetic material deposited on the disc is controlled. Thus, by selectively varying the pressure and the rates of reciprocation of the moving disc and spraying assembly, the thickness and uniformity of the coat of magnetic material on the disc may be precisely selected to meet desired characteristics.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
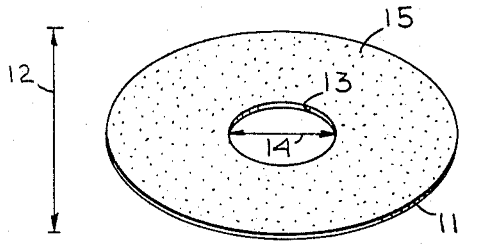
FIGURE 1 is an isometric view of a coated magnetic disc.

Referring to FIGURE 1, there is shown a disc 11 having an outside diameter designated by arrow 12 and a centrally disposed aperture 13 of diameter 14. The disc is coated on one or on both sides with a coat of magnetic material 15.

Figure 2:
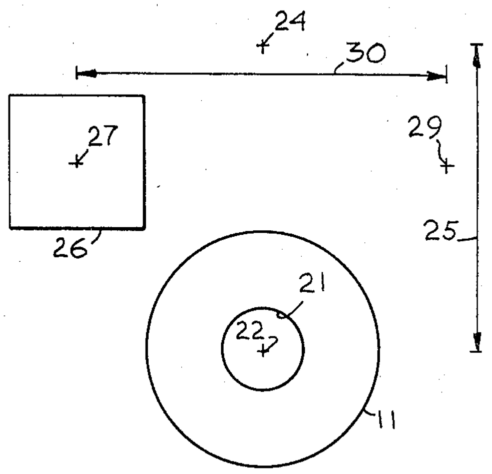
FIGURE 2 is a diagram useful in explaining the principles of the present invention.

The novel method of the present invention of coating the disc 11 may best be explained in conjunction with FIGURE 2. Therein, disc 11, mounted on a disc assembly by means of a cover 21, is diagrammed as reciprocating between end positions 22 and 24. The reciprocating stroke of the disc assembly is designated by arrow 25. Similarly, a spray assembly 26 is shown reciprocating between end positions 27 and 29 as designated by arrow 30. Thus, disc 11 is shown reciprocating in a first axis or direction whereas spray assembly 26 reciprocates in a second axis perpendicular to the first axis.

Figure 3:
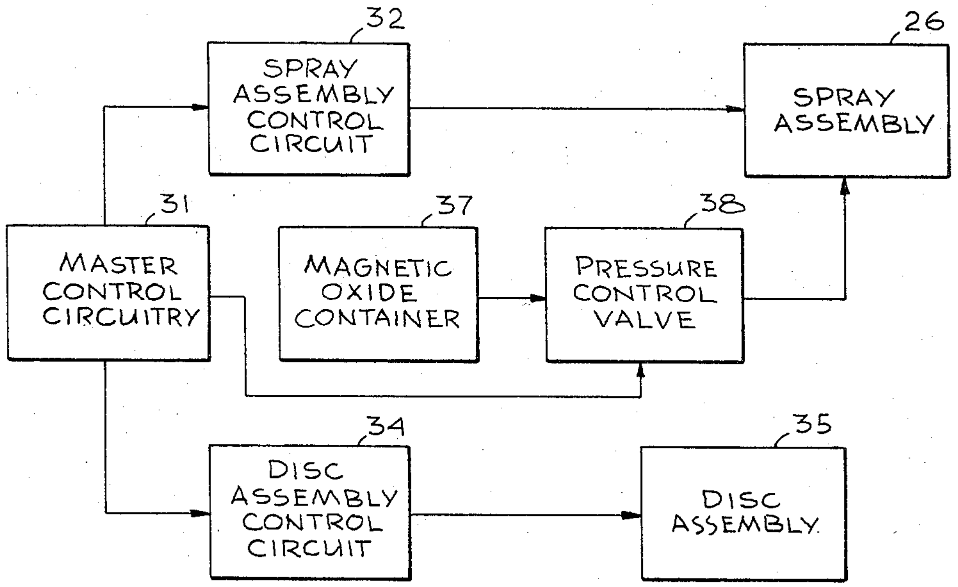
FIGURE 3 is a block diagram of the apparatus of the present invention.

Reference is now made to FIGURE 3 which is a simplified block diagram of the apparatus of the present invention. The spray assembly 26 is shown connected to a master control circuitry 31 through a spray assembly control circuit 32. Similarly, the master control circuitry 31 is connected through a disc assembly control circuit 34 to a disc assembly 35. Also, a container 37 containing magnetic oxide is coupled to the spray assembly 26 through a pressure control valve 38 which is also connected to the master control circuitry 31.

The master control circuitry 31 controls via circuits 32 and 34 the speeds or rates of reciprocation of the spray assembly 26 and disc assembly 35 respectively, thus controlling the number of layers of magnetic oxide deposited on the disc 11. Also, the circuitry 31 controls the pressure at which the magnetic oxide is supplied to the assembly 26 to be sprayed on the disc, thus controlling the thickness of each layer of magnetic oxide deposited thereon.

In one actual reduction to practice, a disc having an outside diameter of 31 inches was mounted on the disc assembly 35 by means of a cover of 9 inches in diameter. The assembly 35 traveled between end position 22 (FIGURE 2) to position 24 and back at a rate of 5 feet per minute (ft./min.) with the stroke 25 being equal to 50 inches. The spray assembly 26 includes spray guns which were supplied with magnetic oxide at 6 pounds of pressure.

Assembly 26 was reciprocated between positions 27 and 29 (FIGURE 2) at a rate of 288 ft./min. with the stroke 30 being equal to approximately four feet. Thus, for each pass of the disc, the spray assembly made approximately fifty passes thus depositing a plurality of layers on the disc.

The coating was controlled to a thickness of $\frac{4}{10}$ of one thousandth of an inch with excellent uniformity so that the magnetic properties of the coated materials were uniform over the entire surface area of the disc.

Figure 4:
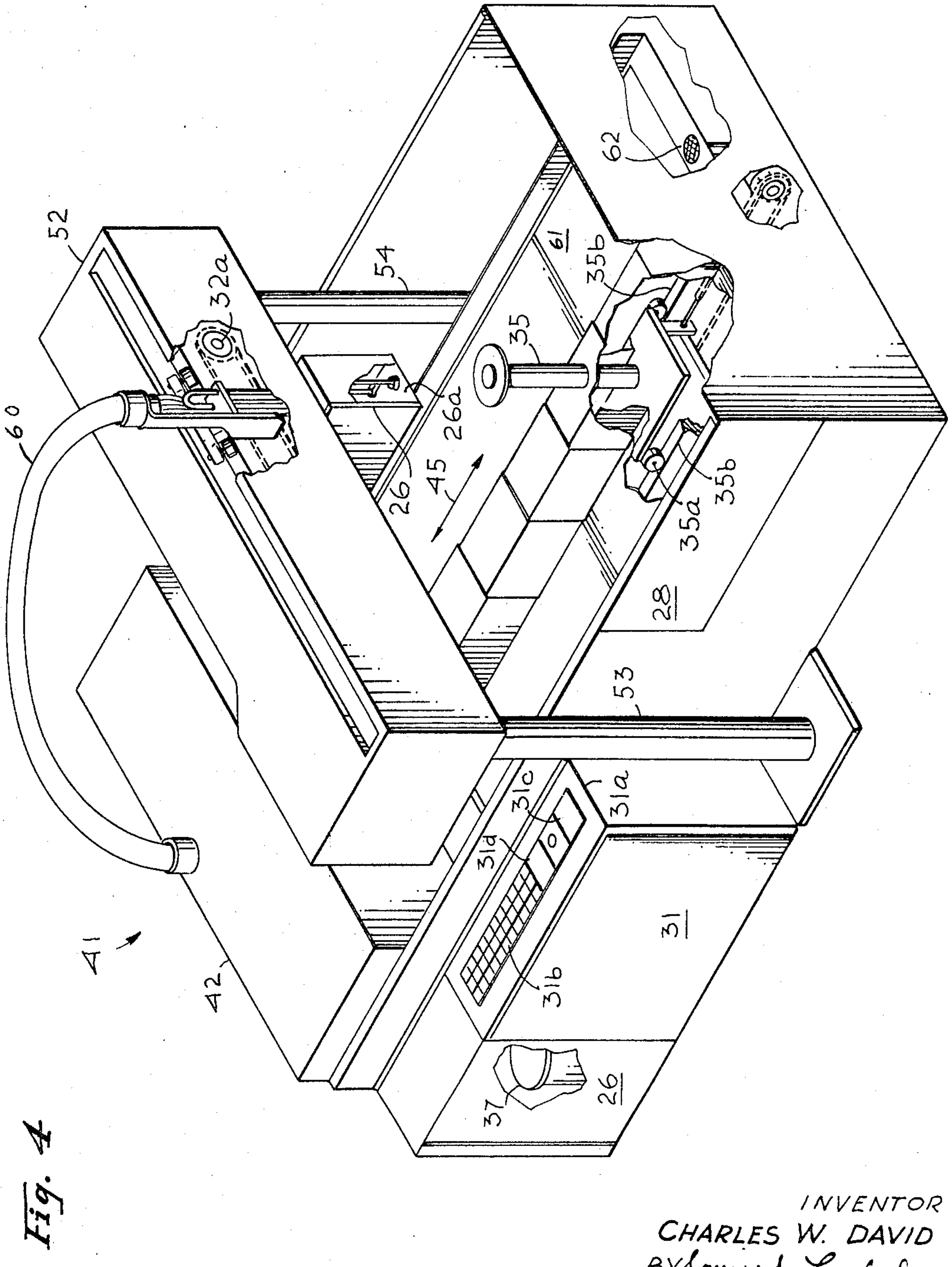
FIGURE 4 is an isometric view of an apparatus constructed in accordance with the teachings of the present invention.

Reference is now made to FIGURE 4 which is an isometric view of an apparatus 41 which was actually used in the reduction to practice hereinbefore referred to. The apparatus 41 comprises a housing 42 wherein the magnetic oxide container 37, the master control circuitry 31, valve 38, and the disc assembly control circuit 34 are housed. A control panel 31*a* of the master control circuitry 31 is mounted exteriorly so that an operator may have access to control switches 31*b* and be able to view meters 31*c* and 31*d* which monitor the speed of the disc assembly and spray assembly respectively. The reciprocating motion of the disc assembly 35 is provided by means of a chain system 32*a* with the assembly 35 moving by means of rollers 35$a$ on rails 35$b$. The disc assembly 35 reciprocates back and forth at a speed of 5 ft./min. along an axis designated by arrow 45, the stroke being equal to 50 inches.

The apparatus 41 also includes the spray assembly 26 which includes one or more spray guns 26$a$. The assembly is mounted under a housing 52 which is supported by posts 53 and 54 so that the spray guns are above the disc assembly when the assembly passes under housing 52. The spray assembly control circuit 32 housed in housing 31 provides reciprocating motion to the spray assembly 26 by means of a chain system 32$a$. Thus, the assembly 32 reciprocates back and forth at a speed of 288 ft./min. along an axis designated by arrow 55, the stroke being equal to about four feet. Cable 60 interconnects housings 42 and 52 to supply the material to be sprayed on the disc to guns 26$a$.

One of the spray guns 26$a$ may be supplied with air rather than coating material, with the guns being controlled so that during the first stroke of the assembly 35, from end positions 22 to 24 (FIGURE 2), only air is sprayed on the disc. The air cleans the disc to provide a clean surface on which the magnetic material is deposited during the second half of the stroke, namely when the disc returns from position 24 to position 22. In addition, apparatus 41 includes a water supply (not shown) which waters down a bottom pan 61 of the apparatus so that any sprayed material not deposited on the disc is washed away through screened drain 62.

An operator may energize switches 31$b$ so that each of the operational steps may take place. In addition, an automatic switch is furnished which, when activated, causes the entire coating operation to be automatically performed. Namely, after securing a disc on assembly 35 by actuating the automatic switch, the disc assembly 35 starts moving from its rest position as shown in FIGURE 4. Also, assembly 26 starts reciprocating, with magnetic material being sprayed through the guns. Then when the assembly returns to its rest position, the assembly 26 is brought to rest and guns 26$a$ are shut off.

The apparatus 41 may include, in addition to the spray guns 26$a$, an air gun so that when the disc assembly travels away from its rest position, air is sprayed and only when the assembly 35 moves towards the rest position is material to be deposited on the disc sprayed through the spray guns.

Summarizing briefly, the present invention provides a method and apparatus whereby thin layers of material may uniformly be deposited on a surface such as a disc. The assembly on which the disc is mounted reciprocates at a first rate in a first direction, and the spray guns used to spray the material on the disc reciprocates in a different direction at a second rate so that by controlling the rates of reciprocation as well as the lengths of the strokes, the number of deposited layers of material can be precisely controlled. Also, by controlling the pressure at which the material is sprayed, the thickness of each layer can be controlled.

The invention has been described in conjunction with the disc assembly and spray assembly reciprocating in mutually perpendicular directions. However, the invention is not limited thereto. Rather, the spray assembly may reciprocate in an arc rather than a straight line without affecting the uniformity of the material deposited on the disc. It should be appreciated that those familiar with the art may make modifications and equivalents in the arrangement as shown without departing from the spirit of the invention. Therefore, all such modifications and equivalents are deemed to fall within the scope of the invention as claimed in the appended claims.

What is claimed is:

1. An apparatus for coating an exposed surface of an element with material to a predetermined thickness and uniformity comprising first means for supporting the element having an exposed surface to be coated; second means for storing material to be coated under a predetermined pressure; dispensing means coupled to said second means to be supplied with said material therefrom; and control means for reciprocating said first means and said dispensing means in two paths having a predetermined relationship with one another to control the number and thickness of coats of material deposited on the exposed surface of said supported element, so as to control the uniformity and thickness of the material deposited thereon.

2. An apparatus for coating an exposed surface of an element with a liquid material to a predetermined thickness and uniformity comprising an assembly for supporting the element having an exposed surface to be coated; a container for storing the liquid material to be coated on the exposed surface at a predetermined pressure; nozzle means coupled to said container for spraying said liquid material therethrough positioned with respect to the exposed surface of said element supported on said assembly; means for reciprocating said assembly and element supported thereon in a first axis at a first rate; and means for reciprocating said nozzle means in a second axis at a second rate, so as to deposit liquid material on the exposed surface of said element each time the reciprocating element and reciprocating nozzle means are in a selected position relationship, whereby the number of layers of liquid material coated on said surface is a function of said first and second rates of reciprocation and the thickness of each coat being a function of said predetermined pressure.

3. An apparatus for depositing on a surface of a disc a coat of magnetic material capable of possessing information storing properties, whereby the thickness and uniformity of the magnetic material are controlled comprising an assembly for supporting the disc to be coated; a container for storing under a predetermined pressure material to be coated on the surface of said disc; a spray nozzle assembly coupled to said container for spraying the magnetic material therethrough under said predetermined pressure; means for reciprocating said assembly in a first path at a first rate; and means for reciprocating said spray nozzle assembly in a second path traversing said first path, at a second rate substantially greater than said first rate so that a layer of magnetic material sprayed through said spray nozzle assembly is deposited on the surface of the disc each time the spray nozzle assembly is adjacent the reciprocating disc, the number of layers of magnetic material being a function of the rate of reciprocation of said spray nozzle assembly and said reciprocating disc and the thickness of each layer being a function of said predetermined pressure.

4. An apparatus for coating a surface of a disc with magnetic material capable of possessing information storing properties, whereby the thickness and uniformity of the coated material is selectively controlled comprising a disc mounting assembly for supporting a disc to be coated; means for reciprocating said disc mounting assembly in a first straight line between first and second end points at a first rate; a spray nozzle assembly mounted above the surface of the disc to be coated adjacent said first straight line between said first and second end point; means for reciprocating said spray nozzle assembly in a predetermined path at a second rate substantially greater than said first rate; and means for supplying magnetic material to said spray nozzle assembly to be sprayed therethrough at a predetermined pressure so that magnetic material is deposited on the surface of said disc, when the reciprocating spray nozzle assembly is substantially above the surface of the reciprocating disc.

5. An apparatus for coating a surface of a disc with magnetic material as recited in claim 4 wherein said spray nozzle assembly reciprocates in a second straight line substantially perpendicular to the path of reciprocation of said disc mounting assembly along said first straight line.

6. An apparatus for coating a surface of a disc with magnetic material as recited in claim 4 wherein said spray nozzle assembly reciprocates in an arc-like path symmetrical with respect to said first straight line defining the path of reciprocation of said disc mounting assembly.

7. A method for depositing a uniform coat of material on an exposed flat surface of an element the steps comprising reciprocating an element having an exposed flat surface in a first path at a first predetermined rate; supplying at a predetermined pressure material to be coated on the surface of said element to a spray nozzle assembly; and reciprocating said spray nozzle assembly in a path which traverses said first path at a second rate substantially greater than said first rate so that material is sprayed by said spray nozzle assembly unto the exposed flat surface of said element when the reciprocating assembly and element are adjacent one another.

8. A method for depositing a coat of magnetic material of uniform thickness and magnetic characteristics on a flat surface of an element, the steps comprising reciprocating an element having an exposed flat surface in a path along a straight line; supplying, at a predetermined pressure, magnetic material to be coated on the flat surface of said element to a spray nozzle assembly; reciprocating said spray nozzle assembly in a path which is symmetrical with respect to the path of reciprocation of said element along said straight line; and controlling the rates of reciprocation of said element and said spray nozzle assembly, and the pressure at which the magnetic material is supplied to the spray nozzle assembly to control the uniformity of thickness and magnetic characteristics of the material deposited on the flat surface of said element.

References Cited

UNITED STATES PATENTS

| | | | |
|---|---|---|---|
| 58,556 | 10/1886 | Salisbury | 118—323 X |
| 2,610,605 | 9/1952 | Paasche | 118—7 |
| 2,952,557 | 9/1960 | Charron | 117—66 X |
| 3,072,095 | 1/1963 | Keessen et al. | 118—323 X |

FOREIGN PATENTS

| | | | |
|---|---|---|---|
| 1,013,335 | 4/1952 | France. | |

ALFRED L. LEAVITT, *Primary Examiner.*

J. H. NEWSOME, *Assistant Examiner.*